A. W. COPLEY.
ELECTRICAL PROTECTIVE DEVICE.
APPLICATION FILED JULY 5, 1917.

1,314,508.

Patented Sept. 2, 1919.

WITNESSES:
Fred. C. Wilham
J H Procter

INVENTOR
Almon W. Copley
BY
Wesley G. Carr
ATTORNEY

UNITED STATES PATENT OFFICE.

ALMON W. COPLEY, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

1,314,508.  Specification of Letters Patent.  Patented Sept. 2, 1919.

Application filed July 5, 1917. Serial No. 178,646.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Electrical Protective Devices, of which the following is a specification.

My invention relates to electrical protective devices and particularly to relay mechanisms and systems that are employed for tripping circuit interrupters, or operating other devices, upon the occurrence of predetermined conditions.

The object of my invention is to provide a simple and economical relay mechanism of the above-indicated character that may be operated by current derived from the circuit in connection with which the interrupter or other device is employed, to trip the interrupter or operate the other device substantially instantaneously when the load carried by such circuit exceeds a predetermined value.

U. S. Patent #1,204,508, granted March 14, 1916, to B. H. Smith and assigned to the Westinghouse Electric and Manufacturing Company, discloses a relay device comprising a stationary magnetizable core member having two magnetic circuits, a movable core member, two series connected windings for opposing each other in their action on the movable core member, a third winding for neutralizing the action of one of the series-connected windings, and a time-element relay for controlling the circuit of the third winding.

In my invention, I utilize the electromagnetic member disclosed in the above-mentioned patent and I so connect a spark gap that the same will break down, when a predetermined current traverses the circuit, to establish a closed circuit for the third winding and thereby render the device instantaneously operative upon the occurrence of a predetermined current in the circuit to be protected.

Figure 1:
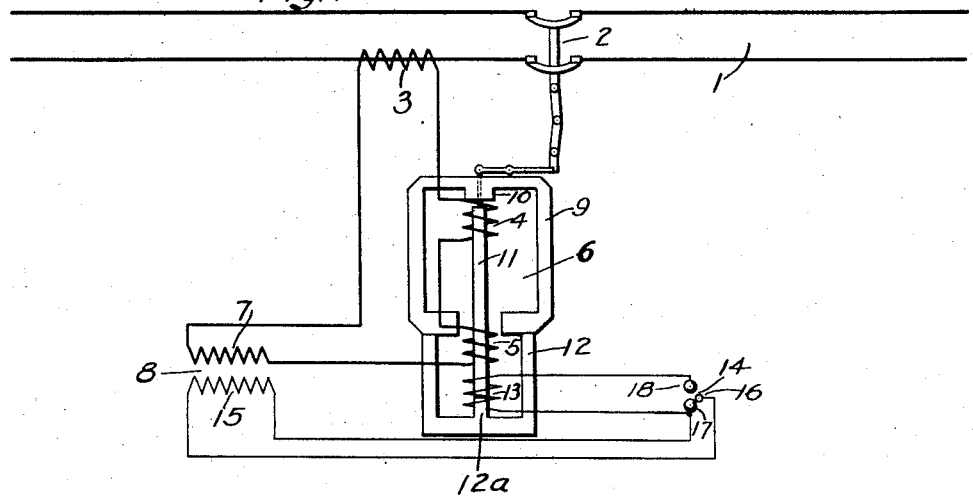
Figure 2:
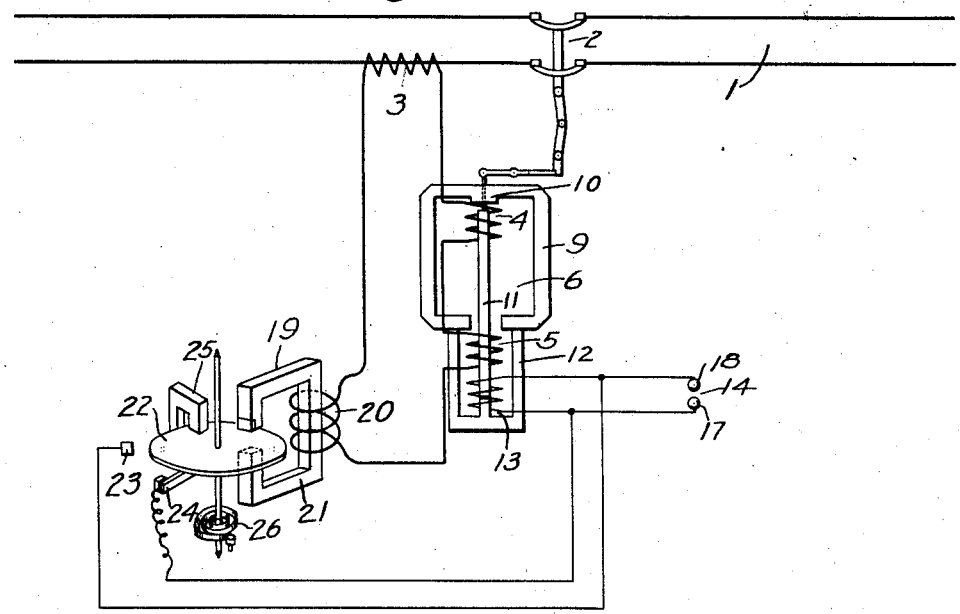

Figure 1 of the accompanying drawings is a diagrammatic illustration of a system embodying my invention, and Fig. 2 is a diagrammatic illustration of a part of a system embodying a modified form of my invention.

A typical system in connection with which the present invention may be employed comprises an alternating-current circuit 1 that is adapted to be interrupted by means of a circuit interrupter 2 and in series with one conductor of which is a current transformer 3. The winding of the transformer 3 is connected in series circuit with windings 4 and 5 of an electromagnetic device 6 and the primary winding 7 of a transformer 8.

The circuit interrupter 2 is adapted to be tripped by means of the electromagnetic device 6 that comprises a stationary magnetizable core member 9 in the form of a hollow rectangle having a pole piece 10 extending inwardly and downwardly from the top cross piece thereof and having a gap in the lower cross piece between which is interposed an armature 11 adapted for substantially vertical movement. The pole piece 10 and the upper end of the armature 11 are surrounded by the winding 4 which tends to raise the armature into engagement with the pole piece.

The electromagnetic device or relay, as thus described, is such as has heretofore been employed as a relay for tripping circuit interrupters but its functions are altered by the use of an auxiliary core part 12 of substantially E-shape that is mounted with its longer legs terminating adjacent the core member 9. The armature 11 normally rests upon the middle leg or pole piece 12$^a$ of the core member 12 and is surrounded by the winding 5. The middle leg or pole piece 12$^a$ and the adjacent end of the armature 11 are surrounded by a winding 13.

The winding 13 is normally open-circuited and its terminals are connected to the respective terminals of a spark gap 14. One of the terminals of the secondary winding 15 of the transformer 8 is connected to one terminal 17 of the spark gap 14 and its other terminal is connected to an auxiliary terminal 16 of the spark gap.

Under normal circuit conditions, the current in the winding 7 of the transformer 8 will not induce sufficient voltage in the winding 15 to cause an arc to pass between the terminals 16 and 17 or between the terminals 17 and 18 of the spark gap 14. However, the windings 4 and 5 are continuously energized so long as the circuit interrupter 2 remains closed. Since these windings are located upon the opposite sides of the lower end cross piece of the core member 9 and are provided with separate magnetic circuits, they exert opposing pulls upon the armature 11. The magnetic circuit of the winding 5, being substantially closed, under normal conditions, the armature remains stationary, in the position shown. Also, since the magnetic circuit of the winding 5 is normally substantially closed, whereas a considerable air gap exists between the pole piece 10 and the corresponding end of the armature 11, it is obvious that the winding 5 may, and preferably does, have a smaller number of convolutions than the winding 4.

When an overload, or other abnormal condition, occurs upon the circuit 1, an increased current is induced in the winding of the transformer 3 which causes a sufficient voltage to be induced in the winding 15 of the transformer 8 to effect a break-down of the resistance of the air between the terminals 17 and 18 of the spark gap 14 and thus establishes a closed circuit for the winding 13. When the spark gap 14 is broken down by reason of an arc jumping from one terminal to the other, current traverses the winding 13 because of the electromotive force induced therein by the winding 5, thereby decreasing the magnetizing effect of the winding 5 because of the counter flux produced by the winding 13. When the magnetizing effect of the winding 5 is reduced, the pull exerted by the winding 4 predominates over that of the winding 5, and the armature 11 is, accordingly, raised to thereby trip the circuit interrupter 2. Inasmuch as, under this condition, the current in the winding 4 is large, as compared with its normal value, and, since the pull of the winding 5 is nearly eliminated because of the quick response of the spark gap 14 to an excessive rise in voltage thereacross, the armature 11 is raised quickly and with considerable force, thereby insuring prompt and substantially instantaneous tripping of the circuit interrupter. When the overload or other abnormal circuit condition disappears or the circuit interrupter is opened, the arc across the terminals 17 and 18 of the spark gap 14 will be extinguished, and, when the circuit interrupter 2 is again closed, the armature 11 will automatically assume its normal reset position.

If it is desired to effect the opening of the circuit interrupter 2 a time interval after the occurrence of predetermined conditions in the circuit 1, I provide a relay device 19, the actuating winding 20 of which is connected in series relation to the windings 4 and 5 of the transformer 3, substantially as shown in Fig. 2 of the drawings. In this modification of my invention, I rely upon the winding 5 to induce voltage in the winding 13 which, when it reaches a predetermined value, will cause the spark gap 14, that is connected across the terminals thereof, to break down and thereby establish a closed circuit for the winding 13, as hereinbefore set forth.

In this modification of my invention, the spark gap 14 is so set that it will not break down under normal overloads, under which conditions it is usually desirable to cause the circuit interrupter 2 to operate a time interval after the occurrence of overload conditions in the circuit 1. For this purpose, the relay 19 is provided which comprises a magnetizable core member 21, the winding 20, an armature 22, and coöperating contact members 23 and 24. The contact members 23 and 24 are connected to the terminals of the winding 13 and are adapted to establish a closed circuit for the same when they are engaged. However, the relay 19 may be provided with a damping magnet 25 and a control spring 26 which are adapted to so control the time period and the operating current of the relay that it may be caused to operate under predetermined conditions. That is, the relay 19 may be either a definite or an inverse time-limit overload relay, as desired, and is preferably so designed that it will be effective for all values of overload up to a predetermined value, at which value the spark gap 14 is effective to secure the substantially instantaneous operation of the device 6.

While I have shown and described my invention as applied to the tripping of a circuit interrupter, it may obviously be employed for other purposes, if desired, without departing from the spirit and scope of the invention as set forth in the appended claims.

I claim as my invention:

1. In an electric circuit, the combination with an electromagnet comprising a stationary core member having two magnetic paths, a movable core member, a winding for each of the paths connected in series relation to the circuit, and a third winding for neutralizing the effect of one of the other windings, of means for substantially instantly establishing a closed-circuit for the third winding when a predetermined excessive overload traverses the circuit.

2. In an electric circuit, the combination with an electromagnet comprising a stationary core member having two magnetic paths, a movable core member, a winding for each of the paths connected in series relation to the circuit, and a third winding for neutralizing the effect of one of the other windings, of a spark gap connected across the terminals of the third winding and adapted to break down under predetermined conditions.

3. In an electric circuit, the combination with an electromagnet comprising a relatively movable core member having two magnetic circuits, a winding that normally energizes one circuit more than the other to attract the movable core member to a predetermined position, of a spark gap, and means for coöperating with the spark gap for neutralizing a portion of the said winding to cause the same to so energize the magnetic circuit as to move the movable core member to another position under predetermined conditions.

4. The combination with an electromagnet comprising two series-connected normally-energized oppositely-acting windings, of a spark gap, and means for coöperating with the spark gap for neutralizing the effect of one of the said windings under predetermined conditions.

5. The combination with an electromagnet comprising a movable armature, a winding that normally attracts the armature to retain it in a given position, of a spark gap, and means for coöperating with the spark gap to cause the winding to move the armature to another position under predetermined conditions.

6. In an electric circuit, the combination with an electromagnet comprising two oppositely-acting windings series connected to the circuit, of means for rendering one of said windings ineffective a time interval after a normal overload traverses the circuit and instantaneously upon the occurrence of an excessive overload.

7. In an electric circuit, the combination with an electromagnet comprising a movable armature, a normally-energized winding tending to actuate the armature, a second winding connected in series relation to the first mentioned winding for preventing such actuation of the armature under normal conditions in the circuit, and a third winding, of means dependent upon the voltage induced in the third winding for establishing a closed-circuit therefor under predetermined conditions.

8. In an electric circuit, the combination with an electromagnet comprising a movable armature, a normally-energized winding tending to actuate the armature, a second winding connected in series relation to the first-mentioned winding for preventing such actuation, and a third winding inductively related to the second winding, of means dependent upon an induced voltage in the third winding for establishing a closed-circuit therefor under predetermined conditions.

9. In an electric circuit, the combination with an electromagnet comprising a movable armature, a normally-energized winding tending to actuate the armature, a second winding for preventing such actuation, and a third winding inductively related to the second winding, of a spark gap connected in circuit with the third winding and adapted to break down under predetermined conditions in the circuit.

10. In an electric circuit, the combination with an electromagnet comprising a movable armature, a normally-energized winding tending to actuate the armature, a second winding for preventing such actuation, and a third winding inductively related to the second winding, of a spark gap connected in circuit with the third winding and adapted to break down instantaneously when a predetermined overload traverses the circuit.

In testimony whereof, I have hereunto subscribed my name this 28th day of June, 1917.

ALMON W. COPLEY.